United States Patent [19]

Parker

[11] Patent Number: 4,947,799

[45] Date of Patent: Aug. 14, 1990

[54] APPARATUS FOR GROOMING ANIMALS

[76] Inventor: Susan Parker, 7240 Dixon, Forest Park, Ill. 60130

[21] Appl. No.: 256,320

[22] Filed: Oct. 11, 1988

[51] Int. Cl.$^5$ .................... A01K 29/00; F26B 13/00
[52] U.S. Cl. ........................................ 119/83; 119/1; 34/202; 34/151
[58] Field of Search ................. 119/1, 83, 85; 34/202, 34/151, 233, 192

[56] References Cited

U.S. PATENT DOCUMENTS

| | | | |
|---|---|---|---|
| 3,175,534 | 3/1965 | Pollard | 34/202 |
| 3,577,650 | 5/1971 | Brahm | 34/151 |
| 4,258,248 | 3/1981 | Campo | 34/243 R |
| 4,314,410 | 2/1982 | Nichols | 34/202 |
| 4,559,903 | 12/1985 | Bloom et al. | 34/202 |

FOREIGN PATENT DOCUMENTS

| | | | |
|---|---|---|---|
| 144499 | 6/1985 | European Pat. Off. | 119/83 |

*Primary Examiner*—John Weiss
*Attorney, Agent, or Firm*—Wallenstein, Wagner & Hattis, Ltd.

[57] ABSTRACT

A hand-held animal grooming tool is configured as a circular hoop-formed curry comb having a sealing cap sealing off the edge of the hoop opposite the comb serrations, and further including a handle attached to the hoop, the handle having an axial passage therethrough communicating with the interior of the hoop. The handle is adapted at its outer end for connection to a flexible conduit fed by a hot air blower so that with the curry comb in use against the body of the animal the open face is effectively sealed by the animal's body, and warm air is blown along the serrations to dry the animal during the combing operation. Alternative versions of the instrument include hollow-chamber brushes having similar handles and having a plurality of air passages for directing heated air flowing into the handle and out these passages generally along the bristle directions. A drying rack for animals includes a hollow resilient bladder in the general shape of a thin elongated mat having air passages in the upper surface thereof and a connecting tubulation adapted for connection to a source of warm air. An animal supporting grate is configured to overlie the mat so as to support the animal thereon to dry the lower portions of the animal's body after washing. The grate has support extensions extending downwardly pass through anchoring apertures passing through the mat so as to retain the air mat in proper alignment with the grate. The rack and mat are configured for ease of cleaning and for retention of excreta in the case of incontinence of the animal.

11 Claims, 3 Drawing Sheets

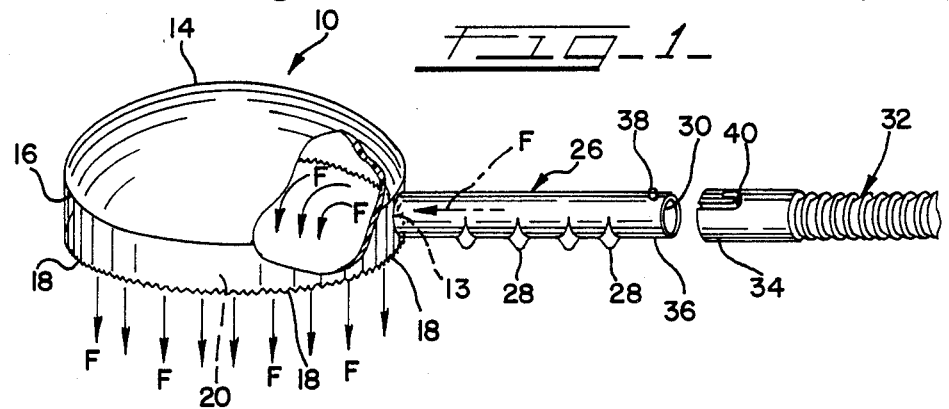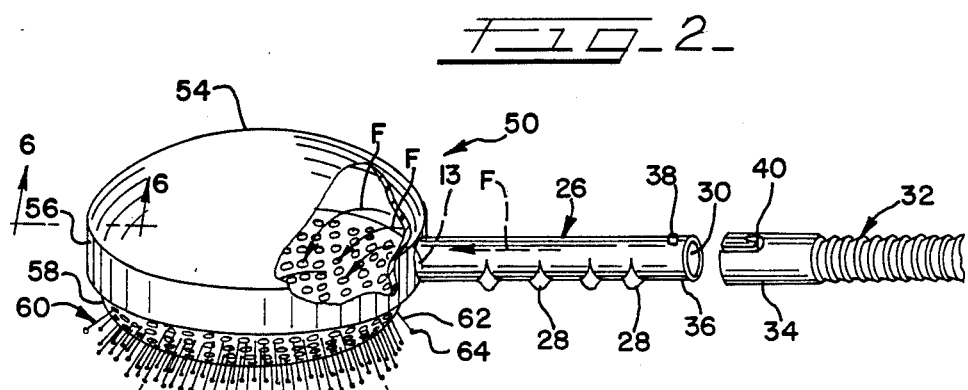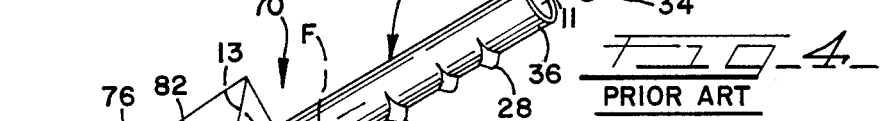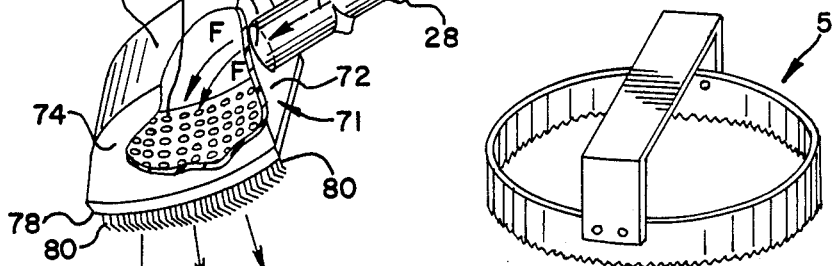

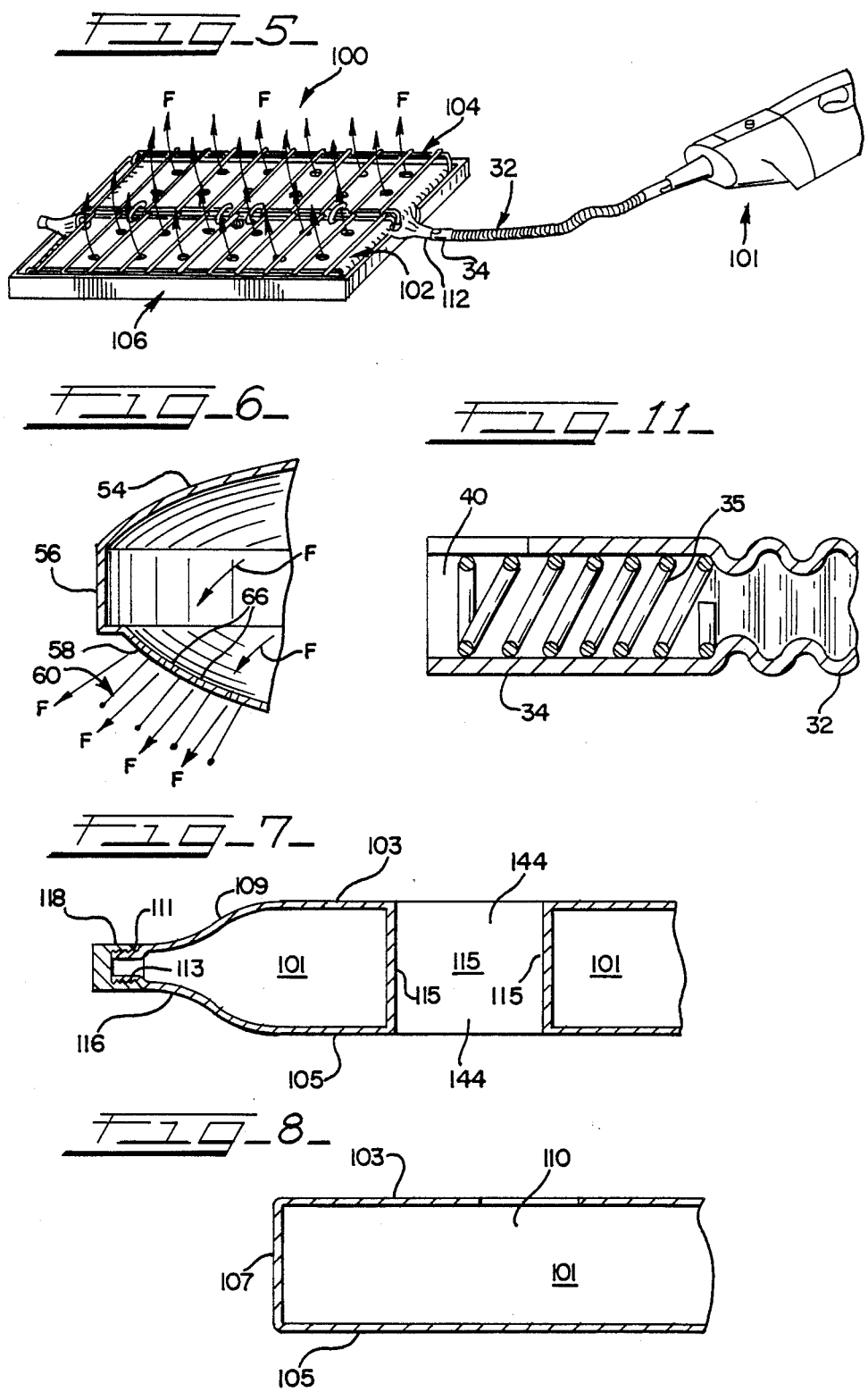

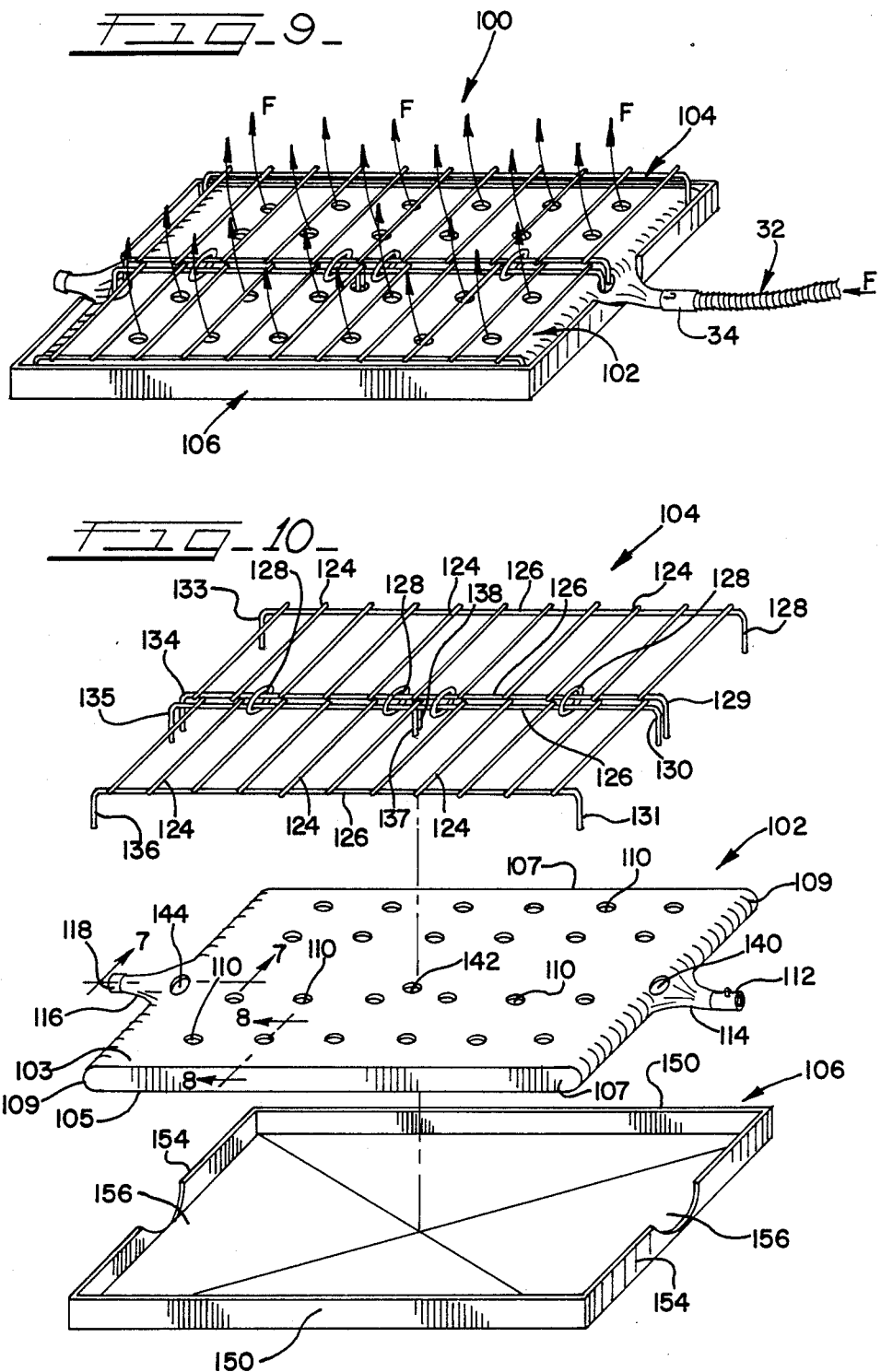

APPARATUS FOR GROOMING ANIMALS

TECHNICAL FIELD

The technical field of the invention is animal grooming and drying apparatus.

BACKGROUND PRIOR ART

The grooming of animals and in particular household pets such as dogs, either for show purposes or for purposes of general sanitation, includes washing the animal. The subsequent drying and grooming of the coat of the animal thereafter, particularly for show purposes, involves combing or brushing the animal's coat and directing a flow of heated air to speed up the drying operation.

This application discloses two forms of animal drying apparatus. One includes a grooming brush so the animal is simultaneously dried and groomed, and the other includes a drying apparatus for drying principally only the underside of the animal as it is sitting or standing on a support grate. The claims of the present application cover only the latter drying apparatus.

One problem in grooming animals is in drying the bottom portion of an animal after the animal has been washed. The underparts of an animal are the slowest to dry under such circumstances, since excess water naturally gravitates to the lower regions. It is desirable to provide a more effective drying means for the bottom portion of a washed animal than a conventional hand-held drying head. The present invention provides a unique approach to initial accelerated drying of the bottom portion of the animal before a final grooming and drying operation is performed in the manner described. As will appear, the accelerated initial drying of the bottom portion of the animal can take place in a cage in which the washed animal is initially placed. The drying operation takes place while the animal in the cage is unattended. Additionally, in the event that the animal is incontinent during this period, it is desirable that means be provided for capturing the draining water and excreta in such a way that it may be removed from the cage and disposed of with minimal difficulty. To the applicant's knowledge, prior to the development of a related form of the instant invention, a completely satisfactory solution to this problem had not been achieved.

SUMMARY OF THE INVENTION

According to a feature of the invention, a drying apparatus for the bottom portion of an animal includes a generally flat, warm air-receiving unit which is preferably a hollow mat made of synthetic plastic material and having spaced confronting top and bottom walls defining a warm air-receiving space therebetween. An inlet tube extends from one end of the mat which is removably attachable to a heating apparatus such as the end of the flexible tube of the previously described heating apparatus. The hollow mat may be placed immediately beneath a rigid spacer. In accordance with a preferred feature of the invention, the grate has short legs. The legs and mat are both preferably seated in the pan. The grate supports the animal in spaced relation to the mat. In accordance with a further preferred feature of the invention, the end wall of the mat may contain a capped drain aperture. The assembly of the pan, grate and mat is sized to be placed onto the bottom of a cage. The animal is placed on the grate in the cage for drying. If the animal is incontinent and urinates, the upward facing apertures on the mat are sufficiently large with respect to the air flow therethrough that urine will enter the mat during cleaning. The cap is removed from the drain aperture when it is desired to drain urine from the mat. Fecal matter is captured on the grate.

BRIEF DESCRIPTION OF DRAWINGS

FIGURES 1–3 show various embodiments of grooming tools of the instant invention.

FIG. 4 shows a prior art curry comb.

FIG. 5 is a perspective view of a blower connected to an animal drying rack.

FIG. 6 is a fragmentary cross-sectional view of a portion of the grooming tool shown in FIG. 2.

FIG. 7 is a cross-sectional view of a portion of an air mat shown in FIG. 10, the view being taken along the lines shown therein.

FIG. 8 is a cross-sectional view of a portion of an air mat shown in FIG. 10, the view being taken along the lines shown therein.

FIG. 9 is a perspective view of an assembled drying rack.

FIG. 10 is an exploded perspective view of the elements shown in FIG. 9.

FIG. 11 is a partial cross-section view of a connector shown in FIGS. 1–3.

DETAILED DESCRIPTION

FIG. 1 shows one embodiment of the present invention adapted to a prior art curry comb (shedding blade) 5 (see FIG. 4). A housing-forming cap 14 is sealingly joined at the edges thereof to the upper edge of a body poirtion 16 configured as a hoop having downwardly facing serrations 18 along the lower rim thereof. The curry comb 10 thus forms a sealed chamber having an open face 20 spanning the entire periphery defined by the hoop edge carrying the serrations 18. The sidewall-forming hoop 16 may be made entirely of a suitable metal or in the alternative may consist of a plastic portion joining the cap 14 to a relatively thin metal curry comb extension. Alternatively, both the cap 14 and the entire hoop 16 may be formed as a single piece, as, for example, a single molded synthetic plastic element. Joining the hoop 16 and extending radially therefrom is a gripping handle 26 preferably having a plurality of finger grip ridges 28 thereon. The handle is configured with an axial air passage 30 communicating with the hollow interior of the curry comb 12 through a side wall aperture 13.

The hollow flexible conduit 32 adapted for connection to blower (see, for example, FIG. 1) adapted to provide a stream of warm air, is provided with a connecting end 34 configured to slide over the outer end 36 of the connector 112. A lock pin 38 radially extending from the outer end 36 of the handle 26 is configured to engage a J-shaped locking slot 40 on the end of the flexible conduit 32. A helical compression spring 35 (see FIG. 6) is disposed within the connecting end 34 of the conduit 32 to provide the requisite axial pressure to retain the pin 38 in the locking slot 40 to hold the assembly 5 together.

It will thus be seen that the flow of air F is such as to bring warm air in through the handle 26 to exit the shedding blade 10 through the open face 20. When placed in contact with the animal for grooming purposes with the serrations 18 pressed into engagement with the body of the animal, the flow of warm air will be forced to flow past the serrations to provide a drying action during the grooming operation.

It will also be evident that the connector formed on the outer end 36 of the handle 26 may equally well be affixed immediately to the hoop 16, or to the housing-forming cap 14, and that the handle may be dispensed with entirely, if so desired.

A pin brush 50 form of grooming tool is shown in FIGS. 2 and 6. The pin brush 50 comprises a preferably generally cylindrical sidewall-forming body portion 56 joining at the bottom edges thereof with a somewhat dome-shaped outwardly convex bottom wall 58. A plurality of bristles 60 radiate downward from the lower wall 58. Each bristle 60, preferably of aluminum, has a straight filamentary shank portion 62 terminating in a rounded bead 64 at the end thereof. The bottom wall 58 may optionally be provided with a thin rubber cushion disposed in contact therewith and to which the bristles 60 are 5 secured for additional flexibility.

A generally dome-shaped cap 54 is sealingly joined to the upper edge of the body portion 56. A hollow handle 26 is provided for connection to a warm air source. A large number of flow apertures 66 are provided in the bottom wall 58 so that the air flow F into the passage 30 of the handle 26 exits the bottom wall to provide a source of heated air flowing in an optimal direction, i.e., generally along the axis of the bristles 60.

FIG. 3 shows the foregoing concepts as applied to a slicker brush 70. Here a body portion 71 has a generally planar end wall 72 from which extends a handle 26 communicating through an aperture 13 in the end wall. The body portion further includes a pair of side walls 74 joining with the end wall 72 and a bottom wall 78. Bristles 80 are configured as a dense array of flexible metallic elements having an initial portion mounted to and extending generally parallel downwardly away from the bottom wall 78, each bristle being bent into a V-shaped form and having terminal portions extending parallel to its neighbors and out of prolongation with the portion joined to the bottom wall 78. A housing-forming top wall 76 is sealingly joined to the end wall 72, the sidewalls 74 and the bottom wall 78. As in the case of the pin brush 50, a plurality of flow apertures 82 are disposed in the housing bottom wall 78 to provide a flow of heated air generally parallel to the axis of the bristles 80.

FIGS. 5, 7, 8, 9 and 10 show elements of a drying apparatus 100 designed for insertion into an animal cage for drying the lower portions of the animal's body after washing. The apparatus 100 is shown in exploded form in FIG. 9 and consists of a perforated air mat 102, preferably sufficiently resilient that it can be folded for storage. The mat 102 is surmounted by an animal support grate 104, the mat and support grate being configured to be supported by a generally planar supporting surface, or in the alternative by a similarly supported pan or tray 106.

In more detail, the air mat 102 is hollow and has confronting upper and lower major walls 103, 105 joined by minor sidewalls 107 and end walls 109. The air mat 102 is also provided with a connector 112 similar to elements 36, 38 of the grooming tools of FIGS. 1-3 for communicating with the interior space 101 of the air mat through a tubular extension 114. A flexible conduit 32 having a connector end 34 similar to those shown in FIGS. 1-3 is connected to a blower 101 to supply heated air to the interior volume 101 of the air mat 102. The blower 101, conduit 32 and connector 34 may also quite evidently be used in conjunction with the grooming tools shown in FIGS. 1-3.

The air mat 102 is configured with a plurality of relatively large air holes 110 in its upper wall surface 103 and communicating with the interior space 101 thereof to provide a flow of air upwards from the upper surface of the mat toward the lower surface of the animal's body. The support grate 104 is configured for disposition immediately above the air mat 102, and is designed to support an animal in a seated or reclining position. An additional cleaning port is provided in the form of a tubular extension 116 disposed communicating with the interior of the air mat 102 at the opposite end thereof and is sealable by means of a removable plug 118 having interior threads 113 configured to engage with external threads 111 on the end of the tubulation.

The support grate 104 consists of a pair of sections 120, 122 each generally configured in the form of a skeletal wire frame consisting of transverse members affixed to a pair of longitudinal members 126 spanning the length thereof. The two sections 120, 122 are joined by loosely fitting hinge links 128 so that the generally planar support grate sections 120, 122 may be folded together. This allows the support grate to be passed into certain designs of animal cages having a relatively small cage door for admitting and removing the animal. Once inserted in the folded form, the support grate 104 can be unfolded to the deployed condition shown in FIGS. 9 and 10.

The sections 120, 122 have right-angled support extensions 128, 129, 130, 131, 133, 134, 135, 136, 137 and 138 extending downwardly therefrom and having sufficient length that when the support grate 104 is emplaced over the air mat 102, the extensions will be supported by the underlying support surface (or the optional tray 106) to hold the grate at a standoff distance when the mat 102, if resilient, is inflated by the flow of air therethrough. Thus, an animal placed in a seated or reclining position on the support grate 104 will be exposed to any upwardly directed flow of warm air from the air holes 110 in the air mat 102.

The air holes 110 are configured to be sufficiently large that if the animal urinates, the urine will be able to flow through these holes to be trapped within the interior of the air mat 102. The mat 102 may then be safely removed from the cage, retaining the urine inside to be removed and cleaned. To facilitate through cleaning of the interior of the mat 102, the plug 118 may be extracted from the tubular extension 116, and a flow of water admitted through the air holes 110 to exit through tubular extension 116 and the connector 112. The mat 102 may optionally be quilted by means apparent to those skilled in the art to insure that urine striking the mat will gravitate towards the air holes 110.

To provide for secure retention and proper positioning of the air mat 102, the mat is provided with preferably three anchoring holes 140, 142, and 144 communicating between the opposite major faces 103, 105 of the mat (See FIG. 7), but having their defining edges sealed from the interior thereof by passage walls 115. The central support extensions 129-130, 134-135, 137-138 are disposed so that they pass completely through their associated anchoring passages 140, 144 and 142 respectively. The air mat 102 is thus held in proper alignment under the support grate 104, and accidental stresses to the flexible conduit 32 will not disturb this alignment. The transverse and longitudinal members 124, 126 of the supporting grate 104 are preferably spaced sufficiently closely so as to retain fecal matter in the event of major incontinence by the animal.

An optional tray 106 may be configured to accommodate the air mat 102 and support grate 104 as shown in FIGS. 9 and 10. Upstanding side walls 150 and end walls 154 are disposed sufficiently outward to accept not only the air mat 102, but the support grate 104 as well. Cut-outs 156 in the end walls 154 accommodate the end tubulations 114, 116 of the air mat 102.

Thus it will be seen that the drying apparatus provides a convenient unit for emplacement within the animal cage, and will then provide for final drying of the lower part of the animal's body after washing.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

Thus, with particular reference to air-flow brushes and combs, it will be evident that the teachings of the instant invention may equally be applied to brushes and combs designed for grooming the hair of human beings.

I claim:

1. An apparatus for drying wet animals comprising: a generally planar grate for supporting said animal; grate support means for supporting said grate at a given short standoff distance above a supporting surface; a warm air-receiving unit configured immediately to underlie said grate and having opposing major top and bottom walls defining therebetween a cavity-forming space, and a plurality of air passage apertures through said top wall communicating with said space; said grate support means including downwardly extending leg-forming means affixed to said grate and configured to extend into engagement with said supporting surface outward of the periphery of said unit; releasable retention means for securing said warm air-receiving unit to said grate; connector means for connection to a source of warm air under pressure; and warm air inlet means communicating between said connector means and said interior space of said unit for admitting warm air to said space to provide an upward flow of air through said apertures directed at the lower body portions of an animal supported above said warm air-receiving unit by said grate.

2. The apparatus of claim 1 wherein said retention means include at least one anchoring passage sealed from said interior space of said warm air-receiving unit and communicating between said major top and bottom walls, and at least one locking projection extending from said grate and disposed to extend through said anchoring passage.

3. The apparatus of claim 2 wherein at least one of said support means is configured to extend through said anchoring passage to act as said locking projection.

4. An apparatus for drying wet animals comprising: a generally planar grate for support said animal; grate support means for supporting said grate at a given short standoff distance above a supporting surface; a warm air-receiving unit configured immediately to underlie said grate and having opposing major top and bottom walls, defining therebetween a cavity-forming space, and a plurality of air passage apertures through said top wall communicating with said space; urine-draining port means communicating with said cavity-forming space of said warm air-receiving unit at an edge of said warm air-receiving unit and including removably replaceable sealing means for sealing and opening said port means; connector means for connection to a source of warm air under pressure; and warm air inlet means communicating between said connector means and said cavity-forming space for admitting warm air to said space to provide an upward flow of air through said apertures directed at the lower body portions of an animal supported above said warm air-receiving unit by said grate.

5. An apparatus for drying wet animals comprising; a generally planar grate for supporting said animal said grate being configured in two sections and a plurality of hinges joining said sections to permit folding said sections together; grate support means for supporting said grate at a given short standoff distance above a supporting surface; a warm air-receiving unit configured immediately to underlie said grate and having opposing major top and bottom walls, defining therebetween a cavity-forming space, and a plurality of air passage apertures through said top wall communicating with said space; connector means for connection to a source of warm air under pressure; and warm air inlet means communicating between said connector means and said space for admitting warm air to said space to provide an upward flow of air through said apertures directed at the lower body portions of an animal supported above said warm air-receiving unit by said grate.

6. Apparatus for drying wet animals, said apparatus comprising a generally rigid planar grate for supporting an animal thereon and a warm air-receiving unit, said grate and warm air-receiving unit being separate elements, with the grate being immediately over the unit so as to be located at a short standoff distance from a bottom support surface for the warm air-receiving unit, so provide a shallow space for placement of said unit, the unit being separately removable from beneath said grate where it can be separately handled and cleaned, said unit having opposing major top and bottom walls defining therebetween an interior cavity, a plurality of air passage apertures through said top wall which immediately underlies the grate and communicating with said cavity, and connecting means for connecting a source of warm air under pressure directed to said cavity, whereby the warm air connected to said cavity circulates upwardly through said apertures in said top wall of said unit to pass through said grate.

7. The apparatus of claim 6 further including a tray for said warm air-receiving unit, said tray having a bottom wall forming said bottom support surface and short upstanding side walls configured to confiningly and removably accept said warm air-receiving unit.

8. The apparatus of claims 6 or 7 wherein said grate has short downwardly extending legs for engaging said support surface at a point outwardly of the periphery of said warm air-receiving unit.

9. The apparatus of claims 2 or 6 in combination with said source of warm air.

10. The combination of claim 9 including urine-draining port means communicating with said interior space at an edge of said mat and including removably replaceable sealing means for sealing and opening said port means, and wherein said grate is configured in two sections and said grating means includes a plurality of hinges joining said sections to permit folding said sections together.

11. The apparatus of claim 6 wherein said warm air-receiving unit is fabricated of resilient material.

* * * * *